No. 673,213. Patented Apr. 30, 1901.
J. A. MENARD.
COMPUTING SCALE.
(Application filed May 25, 1900.)
(No Model.) 3 Sheets—Sheet 2.
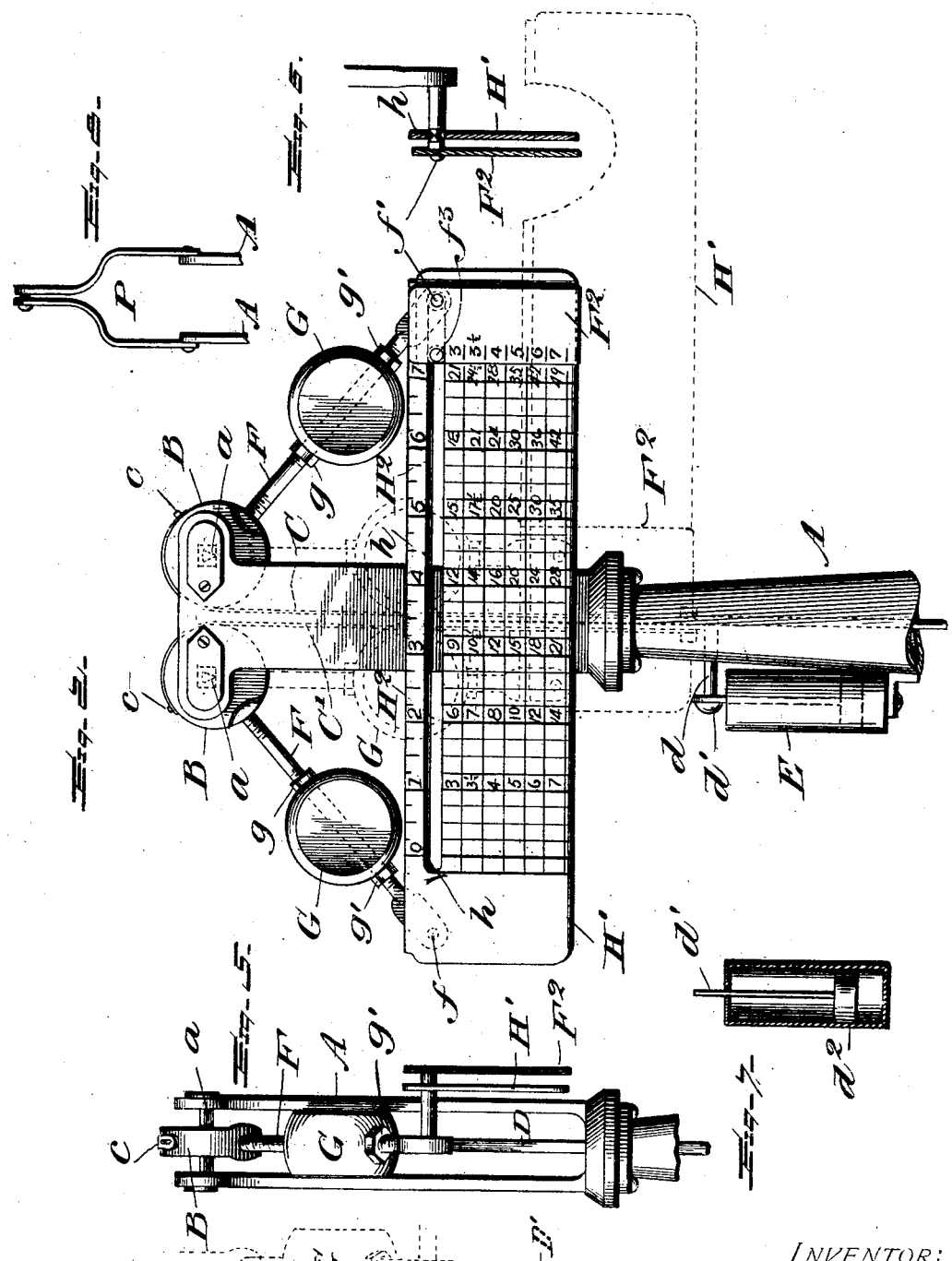
WITNESSES:
L. C. Hills
Grace P. Brereton
INVENTOR:
Joseph A. Menard,
BY Sturtevant & Greely
Attorneys No. 673,213. Patented Apr. 30, 1901.
J. A. MENARD.
COMPUTING SCALE.
(Application filed May 25, 1900.)
(No Model.) 3 Sheets—Sheet 3.
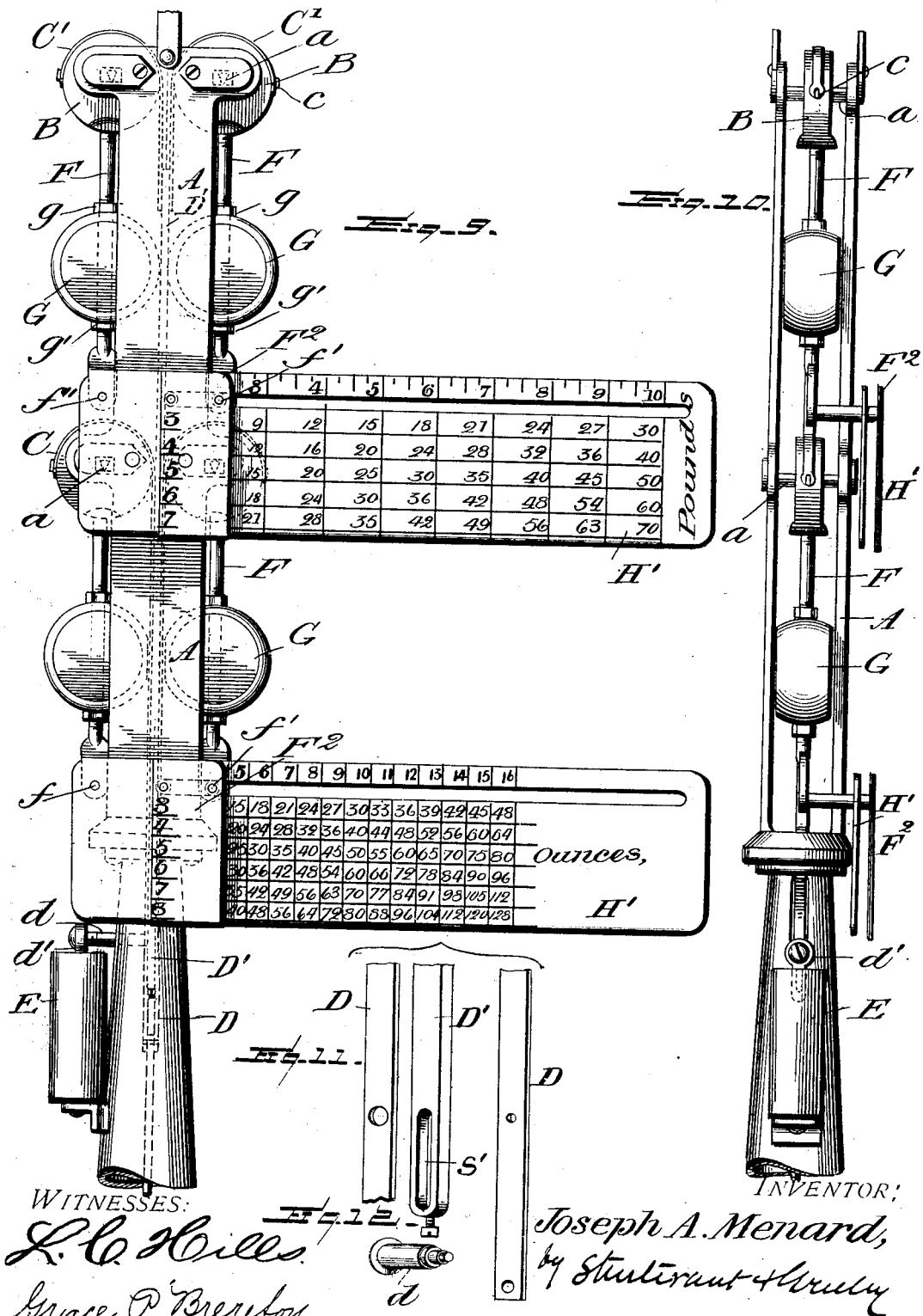
WITNESSES:
L. C. Hills
Grace P. Brenton
INVENTOR:
Joseph A. Menard,
by Sturtevant & Healy
Attorneys

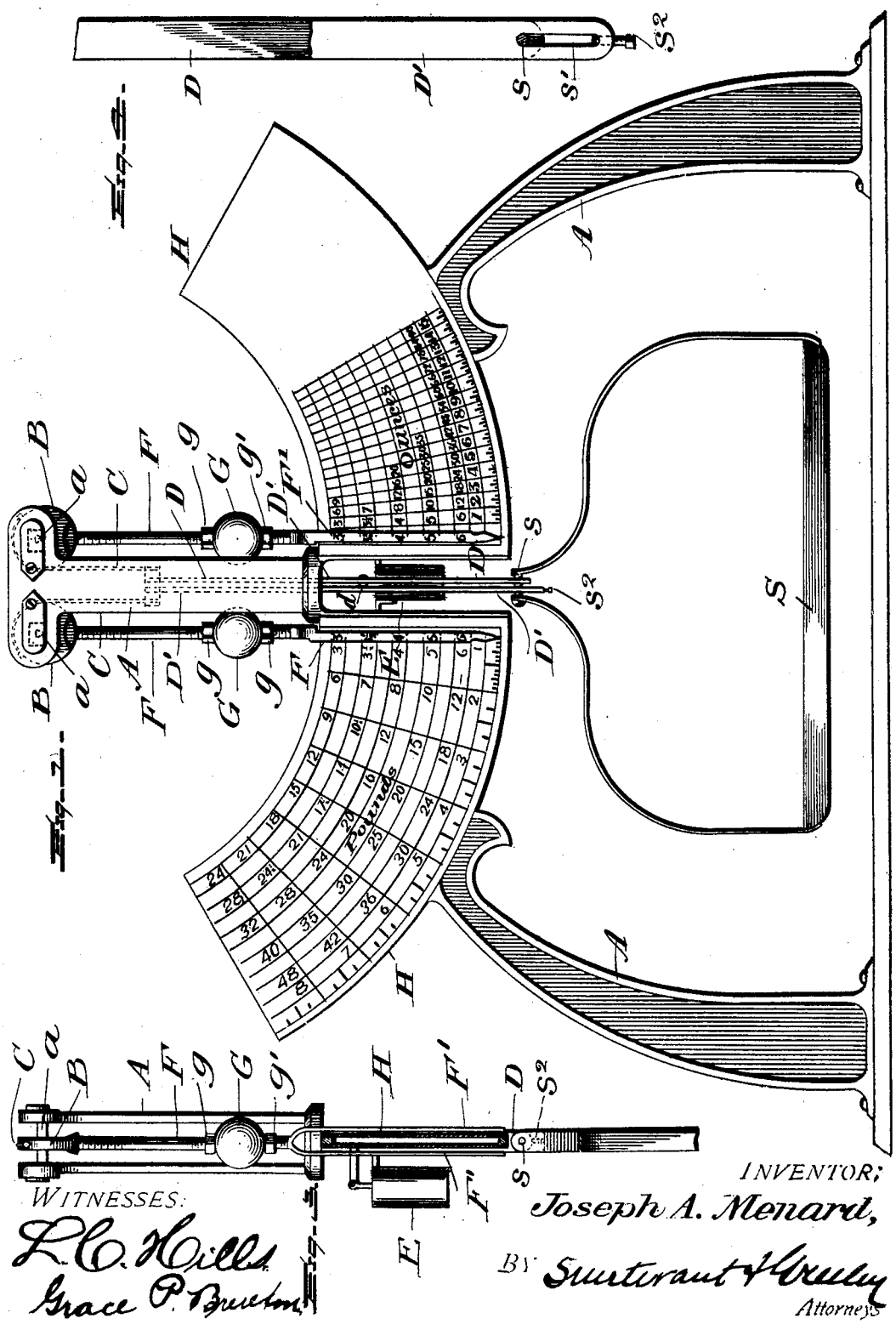

UNITED STATES PATENT OFFICE.

JOSEPH A. MENARD, OF PHŒNIX, ARIZONA TERRITORY.

COMPUTING-SCALE.

SPECIFICATION forming part of Letters Patent No. 673,213, dated April 30, 1901.

Application filed May 25, 1900. Serial No. 17,997. (No model.)

*To all whom it may concern:*

Be it known that I, JOSEPH A. MENARD, a citizen of the United States, residing at Phœnix, in the county of Maricopa, Arizona Territory, have invented certain new and useful Improvements in Computing-Scales, of which the following is a description, reference being had to the accompanying drawings, and to the letters of reference marked thereon.

My improvement relates to the class of weighing-scales in which by means of a scale and indicator the weight of a commodity is indicated and at the same time the price of such commodity at any determined price per unit of weight is also indicated; and my invention consists in the construction, hereinafter shown and described, by which the same scale is adapted for readily weighing small quantities of high-priced commodities and large quantities of low-priced commodities, by which the indicator is caused to pass over a greater length of the scale-card than usual, so that numerals in larger type may be used, and by which the scale is in general rendered more simple and convenient than those heretofore used for the same purpose.

In the accompanying drawings, Figure 1 is an elevation of one form of scale having the improvements by which it is adapted to different classes of commodities. Fig. 2 is a view showing my improved scale-card and indicator and the mechanism by which the scale-card and indicator are both given positive movement relative to each other. Fig. 3 is a side view of a portion of my improved scales. Figs. 4, 5, 6, 7, and 8 are detail views. Figs. 9 and 10 are respectively a front and side view of a scale embodying both the improvements by which the scale is adapted for different classes of commodities and the improvements by which the scale-card and indicator are both given positive movement relative to each other, and Figs. 11 and 12 are detail views.

In the drawings, A is a supporting-frame, which may be of any novel or convenient form. In Fig. 1 I have shown this as the standard of a scale having a depending pan. In Fig. 2 I have shown it as the standard of a platform or counter scale. Whatever form of supporting-frame is used it carries near its upper end bearings on which rest the knife-edges $a$, which form the journals of wheels or hubs B. On the peripheries of the wheels or hubs B are wound flexible bands or cords C, their ends being secured to the hubs at $c$. These are connected at their lower ends to rods D D', to which the scale-pan S is hung in Fig. 1 and which is connected with the platform through a system of levers in the form of scale shown in Fig. 2. From the side of rod D projects an arm $d$, to the end of which is pivotally secured a rod $d'$, carrying a piston $d^2$, which plays in a dash-pot E, secured to the standard and partly filled with a heavy liquid, preferably mercury.

Extending radially from each of the wheels or hubs B is a pendulum-rod F, screw-threaded, as shown, and carrying a weight which may be adjusted on the rod by means of nuts $g$ and $g'$.

In the form shown in Fig. 1 each of the rods F carries at its outer end an indicator F', which as the rod is turned on its knife-edge journals sweeps over a scale or price card H, fixed to the standard. This scale or price card is marked along its lower edge with divisions to indicate units or fractions of units of weight. In the scale shown in Fig. 1 I prefer to mark the scale or price card at the right of the figure with divisions indicating ounces and fractions of an ounce. The scale or price card at the left is marked with pounds and fractions of a pound, for the purpose hereinafter explained.

The scale-card has above the weight-marks concentric rows of figures indicating price per unit of weight and multiples of such price. For instance, the top row, the rows being concentric with the row carrying the weight indications, may be multiples of three, the second may contain multiples of three and one-half, and so on. The indicator F' is marked with numbers corresponding to the several rows of numbers on the card.

In using my improved scale, as shown in Fig. 1, the commodity to be weighed is deposited in the scale-pan S'. As the pan is depressed the wheels or hubs B, through the rods D D' and bands or cords C, are turned on their knife-edge bearings $a$, carrying with them the rods F, with their weights G, and causing the indicator to sweep over a number of divisions of the price or scale card corresponding with the weight of the commodity. The extreme end of the indicator will point to the weight, and the total price may be found at a glance in the row corresponding to the numeral on the indicator which indicates the price per unit of weight. The vibration of the scale will be to a large extent controlled by the dash-pot E.

As above stated, the scale-card at the right of Fig. 1 is preferably marked to indicate ounces and fractions of an ounce. The indicator F', which sweeps over this scale-card, which is carried by rod F, as described, is caused to move through rod D, band or cord C, attached thereto, and wheel or hub B, to which it is attached. The scale-pan is secured to the lower end of the rod D by means of a pin $s$, which passes through this rod. This pin also passes through a slot $s'$ in the rod D' parallel with rod D and arranged through band or cord C, wheel or hub B, and rod F when drawn downward to cause an indicator F' to sweep over the scale or price card H, arranged at the left of Fig. 1. The length of the slot $s'$ is adjusted by a set-screw $s^2$ and is so regulated that for weights less than a determined amount—for instance, one pound—the rod D only will be actuated, the pin $s$ playing freely in the slot $s'$. A commodity weighing in excess of this determined amount will depress the scale-pan, so that pin $s$ will come in contact with the lower end of the slot and will cause the rod D' to descend with the rod D, will lift the weight G at the left of the figure as well as that at the right, and will cause the indicator F' at the left of the figure to sweep over its scale or price card. As two weights G have now to be lifted, a given weight in the scale-pan will cause less movement of the indicator than before. It will therefore be understood that the divisions of the scale-card H at the left of the figure will necessarily indicate units of weight of larger denomination than those indicated by the divisions on the scale at the right of the figure. As the rod D moves with the rod D', a single dash-pot will be sufficient to control the vibrations whether large or small amounts are to be weighed.

The price or scale cards H are marked alike on both sides, and the indicator F' is caused to embrace the card, as shown in Fig. 3. By this arrangement the customer, as well as the dealer, is enabled to see what weight and price are indicated.

In Fig. 2 I have shown a device for giving to both the price or scale card and the indicator positive movement. This device, as shown, is intended for use in scales which have but a single rod D, but, as hereinafter pointed out, may be readily adapted for use in scales having rods D and slotted rod D' and intended to weigh small quanties of high-priced commodities on one scale and larger quantities of lower-priced commodities on a separate scale. In this construction the rod D has attached to it two bands or cords C, which are respectively secured to the peripheries of two wheels or hubs B, journaled on knife-edges $a$ at opposite sides of the standard A. Each of these wheels or hubs B carries a rod F, on which a weight G is adjustable, as before described. To the lower end of one of these rods F, preferably the one at the left of Fig. 2, is pivotally secured by pivot $f$ a price or scale card H', which has a slot H², preferably having knife-edges $h$, arranged lengthwise in its upper part and the divisions indicating weight arranged, preferably, at the top above the slot and the rows of divisions indicating price per unit of weight and multiples thereof arranged below the slot. To the lower end of the other one of the rods F is pivotally secured by pivot $f'$ an indicator F². The pivot $f'$ has grooves adapted to fit and slide easily in the slot H². The indicator F² is provided also with a rod $f^3$, which is also provided with grooves to fit and slide easily in the slot H². Before the commodity to be weighed is placed on the scales the rods F will hang perpendicularly, as shown in dotted lines in Fig. 2, and the price or scale card, being pivotally secured to one of the rods F, will have been carried to the right in Fig. 2, bringing the zero-point of the scale opposite the central line of the standard, and the indicator F², being pivotally secured to the other of the rods F, will have been carried to the left, bringing its inner edge opposite the central line of the standard and into coincidence with the zero-point of the card. The commodity to be weighed being placed on the platform or in the pan of the scales, the rod D will be drawn downward, causing, through the bands or cords C and wheels or hubs B, the weights G to be lifted. As they are lifted the lower ends of the rods F will separate, causing the card H' to move upward and at the same time to the left and causing the indicator F² to move upward and to the right, sliding in the slot H² of the card. For any given weight the edge of the indicator and the zero-point of the card will be separated twice the distance which they would be separated if the indicator only moved. It will thus be possible to use on the card numerals of twice the size of type which could be used on a stationary card. If preferred, the increased space thus secured may be utilized to make the divisions smaller, thus making more accurate weighing possible.

It will of course be understood that in the scale shown in Fig. 2 the dash-pot E will be used. In adapting this form of indicating device to weighing small and large quantities, as may be done on the form of scales shown in Fig. 1, it will be necessary to duplicate the mechanism shown in Fig. 2, arranging the hubs, weights, scale-card, and indicator for the large quantities either above the corresponding devices for small quantities, as shown in Fig. 9, or parallel with and in the rear of such devices, as indicated in dotted lines in Fig. 7, the bands or cords of the device for weighing large quantities in either case having a slotted connection with the support for the article to be weighed, so that such bands or cords will be operated only when the article to be weighed exceeds a predetermined weight.

In Fig. 9 the bands or cords C' of the device for weighing large quantities are secured to a rod D', which has at its lower end a slot $s'$ and a screw $s^2$ for regulating the length of the slot. The bands or cords C of the device for weighing small quantities are each connected to a rod D, to the lower end of which the scale-pan or other support for the article to be weighed is secured. In the form shown in Fig. 9, which shows my invention adapted for use as a platform-scale, the connection between the rods D and D', by which the rod D' is drawn downward only after the rods D have reached a predetermined point, is effected by the arm $d$, which carries the piston-rod $d'$ of the dash-pot and which passes through the slot $s'$. Any other convenient means for this purpose may be employed, it being essential only that the connection between the devices for weighing small and large quantities be such that the device for weighing large quantities shall not be brought into operation until the indicator of the device for weighing small quantities has reached a predetermined point—in the present instance the end of the division-marks on the scale-card.

P in Fig. 8 is a loop which may be used to suspend the scale from a hook instead of supporting it by the standard A, as shown, and may of course be used with either form of scale shown.

Having thus described my invention, what I claim, and desire to secure by Letters Patent, is—

1. In a weighing-scale, the combination of a supporting-frame, a support for the article to be weighed, a rod by which said support is carried, weighing mechanism carried by the supporting-frame, and to which the rod is connected, a second rod having a slotted connection with the support for the article to be weighed and separate weighing mechanism carried by the supporting-frame, to which said second rod is connected; substantially as described.

2. In a computing-scale, the combination with the supporting-frame, a hub journaled therein, a band wound on said hub and connected to the support for the article to be weighed, a dash-pot containing liquid secured to the supporting-frame, a piston therein movable with the band, a rod carried by and projecting radially from the hub and having an adjustable weight thereon, and an indicator on said rod on the same side of the center as the weight and having unit-price marks in a row thereon, of a card having weight indications thereon and also provided with rows of figures indicating multiples of the unit-price marks on the indicator, the parts being so arranged that the indicator will pass freely over the surface of the price-card; substantially as described.

3. In a weighing-scale, the combination with a supporting-frame, a plurality of hubs journaled therein, bands secured at one end to the periphery of one of the hubs, and at the other end connected to the support for the article to be weighed, a radial rod carried by each of the hubs and provided with an indicator, of a card having weight indications thereon over which the indicator is arranged to move, one of the bands being so connected to the support for the article to be weighed as to be operable only when the other band reaches a predetermined point; substantially as described.

4. In a weighing-scale, the combination with a supporting-frame, a plurality of hubs journaled therein, bands secured at one end to the periphery of one of the hubs, and at the other end connected to the support for the article to be weighed, a radial rod carried by each of the hubs and provided with an indicator, of a card having weight indications thereon over which the indicator is arranged to move, one of the bands having a slotted connection with the support for the article to be weighed; substantially as described.

5. In a weighing-scale, the combination with a supporting-frame, a plurality of hubs journaled therein, bands secured at one end to the periphery of one of the hubs, and at the other end connected to the support for the article to be weighed, one of the bands being so connected with the support for the article to be weighed as to always move with it, a piston movable with said band, and a dash-pot secured to the supporting-frame containing liquid in which the piston is arranged to move, another of said bands being so connected to the support for the article to be weighed as to be operable only when the other band has moved a determined distance, a radial rod carried by each of the hubs and provided with an indicator, of cards having weight indications thereon over which the indicators are arranged to move; substantially as described.

6. In a weighing-scale, the combination with a supporting-frame, a plurality of hubs journaled therein, bands secured at one end to the periphery of one of the hubs, and at the other end connected to the support for the article to be weighed, a radial rod carried by each of the hubs and provided with an indicator, of a card having weight indications thereon over which the indicator is arranged to move, one of the bands having a slotted connection with the support for the article to be weighed and means for regulating the length of the slot; substantially as described.

7. In a weighing-scale, the combination with the weighing mechanism, of a card bearing weight indications, an indicator slidably connected with the card and arranged to move over its face, and means operated by the weighing mechanism for giving the card and indicator simultaneous movement in opposite directions; substantially as described.

8. In a computing-scale, the combination with the weighing mechanism, of a card bearing weight indications, and rows of figures indicating multiples of unit-price marks, an indicator bearing unit-price marks in a row thereon, slidably connected with the card and arranged to move over its face, and means operated by the weighing mechanism for giving the card and indicator simultaneous movement in opposite directions; substantially as described.

9. In a computing-scale, the combination with a supporting-frame, a plurality of hubs journaled therein, a band wound on the periphery of each of the hubs, the bands being connected at their other ends to the support for the article to be weighed, a radial rod connected to each of the hubs and carrying a weight, a card bearing weight or price indications pivotally connected to one of the radial rods, an indicator pivotally connected to another of said radial rods, the card and indicator being slidably connected; substantially as described.

10. In a computing-scale, the combination with a supporting-frame, a plurality of hubs journaled therein, a band wound on the periphery of each of the hubs, the bands being connected at their other ends to the support for the article to be weighed, a piston movable with one of said bands, a dash-pot containing liquid secured to the supporting-frame, in which the piston is arranged to move, a radial rod connected to each of the hubs and carrying a weight, a weight or price card pivotally secured to one of the radial rods, an indicator pivotally secured to another of the radial rods, the card and indicator being slidably connected; substantially as described.

11. In a computing-scale, the combination with a supporting-frame, a plurality of hubs journaled therein, a band wound on the periphery of each of the hubs, the bands being connected at their other ends to the support for the article to be weighed, a radial rod connected to each of the hubs and carrying a weight, a card bearing rows of figures indicating multiples of unit-price marks, pivotally connected to one of the radial rods, an indicator pivotally connected to another of the radial rods and bearing unit-price marks in a row thereon, the card and indicator being slidably connected; substantially as described.

12. In a computing-scale, the combination with a supporting-frame, a plurality of hubs journaled therein, a band wound on the periphery of each of the hubs, the bands being connected at their other ends to the support for the article to be weighed, a radial rod connected to each of the hubs and carrying a weight, a weight or price card having a longitudinal slot therein pivotally connected to one of the radial rods, an indicator pivotally connected with another of the radial rods and having guides thereon arranged to move in the slot in the card; substantially as described.

13. In a computing-scale, the combination with a supporting-frame, a plurality of hubs journaled therein, a band wound on the periphery of each of the hubs, the bands being connected at their other ends to the support for the article to be weighed, a radial rod connected to each of the hubs and carrying a weight, a card bearing weight or price indications pivotally connected to the other of the radial rods, the card and indicator being slidably connected, the parts being so arranged that the zero-line of the card and the edge of the indicator will coincide opposite the central line of the supporting-frame when the scale is not in use; substantially as described.

In testimony whereof I affix my signature in presence of two witnesses.

JOSEPH A. MENARD.

Witnesses:
 GRAFTON L. McGILL,
 A. P. GREELEY.